(12) United States Patent
Chen

(10) Patent No.: US 9,365,073 B2
(45) Date of Patent: Jun. 14, 2016

(54) VEHICLE WHEEL

(71) Applicant: Kuan-Ting Chen, New Taipei (TW)

(72) Inventor: Kuan-Ting Chen, New Taipei (TW)

(*) Notice: Subject to any disclaimer, the term of this patent is extended or adjusted under 35 U.S.C. 154(b) by 150 days.

(21) Appl. No.: 14/254,299

(22) Filed: Apr. 16, 2014

(65) Prior Publication Data
US 2014/0339887 A1    Nov. 20, 2014

(30) Foreign Application Priority Data

May 20, 2013 (TW) .............................. 102117807 A

(51) Int. Cl.
| | |
|---|---|
| B60B 7/06 | (2006.01) |
| B60B 7/00 | (2006.01) |
| B60B 19/10 | (2006.01) |
| B60B 7/08 | (2006.01) |
| B60B 3/10 | (2006.01) |

(52) U.S. Cl.
CPC .............. *B60B 7/0066* (2013.01); *B60B 7/0086* (2013.01); *B60B 7/063* (2013.01); *B60B 7/065* (2013.01); *B60B 7/08* (2013.01); *B60B 19/10* (2013.01); *B60B 3/10* (2013.01); *B60B 2900/1216* (2013.01)

(58) Field of Classification Search
CPC .... B60B 7/008; B60B 7/0086; B60B 7/0066; B60B 7/063; B60B 7/065; B60B 7/066; B60B 7/10; B60B 7/12; B60B 7/08
See application file for complete search history.

(56) References Cited

U.S. PATENT DOCUMENTS

| | | | |
|---|---|---|---|
| 2003/0102712 A1* | 6/2003 | Fitzgerald | B60B 7/04 301/37.25 |
| 2009/0236902 A1* | 9/2009 | Zibkoff | B60B 1/003 301/104 |
| 2010/0194181 A1* | 8/2010 | Noriega | B60B 1/06 301/37.26 |

FOREIGN PATENT DOCUMENTS

| | | |
|---|---|---|
| TW | 254216 | 8/1995 |
| TW | M362122 | 8/2009 |

* cited by examiner

*Primary Examiner* — Jeffrey J Restifo
*Assistant Examiner* — Erez Gurari
(74) *Attorney, Agent, or Firm* — Rosenberg, Klein & Lee

(57) ABSTRACT

A vehicle wheel includes a wheel body and a plurality of rim blades. The plurality of rim blades is coupled to at least one side surface of the wheel body. Each of the rim blades is provided with at least one airflow guide section and at least one airflow-assisting section. The airflow guide section and the airflow-assisting section are arranged in the form of front and rear series on the rim blade. When the vehicle wheel is coupled with a tire, the airflow guide section is located at the side of the rim blade facing a forwarding direction of rotation of the wheel and the airflow-assisting section is located at the side of the rim blade opposite to the forwarding rotation of the wheels. As such, airflow is increased, wind resistance is reduced, and noise is reduced.

10 Claims, 20 Drawing Sheets

VEHICLE WHEEL

BACKGROUND OF THE INVENTION

1. Field of the Invention

The present invention relates to a vehicle wheel, and in particular to a structure of vehicle wheel that comprises a wheel body of which a side comprises a plurality of rim blades attached thereto in such a way that the rim blades help guide airflows to reduce wind resistance and noise and also to provide an assisting force for forward movement.

2. The Related Arts

There are a great number of modes and types of automobile wheels, but most of them put emphasis on the outside appearance or the shape thereof. Although some vehicle wheels are designed and claimed to provide an effect of reducing wind resistance, most of them are better in decoration than actually reducing wind resistance. For example, Taiwan Utility Model M362122, which discloses a carbon fiber wheel that reduces side wind resistance, and Taiwan Utility Model 254216, which discloses a novel wheel, both uses airflow guide holes or air passage structure to reduce wind resistance. However, the effectiveness of reduction of wind resistance by using airflow guide holes or air passage to guide airflows is actually poor and may induce turbulences inside and outside the wheel and noises. They only provide a minor effect of reducing wind resistance and actually have no way to substantially reduce wind resistance and to take advantage of air guidance to make the wheel assisting the vehicle to move better. Further, these known designs provide no individual airflow guide structures for left-side and right-side wheels, so that although the wheel on one side of the vehicle may have an effect of reducing wind resistance, yet the wheel on the opposite side may have an adverse effect of increasing wind resistance, whereby the effects of reducing and increasing wind resistance offset each other, giving no net reduction of wind resistance. Further, these known wheels or wheel structures are provided for passively reducing wind resistance against the wheel and they do not intend to make the vehicle wheels to generate an assisting force when the vehicle is being driven. Thus, they do not have an effect of providing a push assisting force to achieve reduction of fuel consumption. A vehicle equipped with such wheels consumes the same amount of fuel and energy in driving as any existing vehicles. This is a concern of the conventional vehicle wheels that need to be overcome.

SUMMARY OF THE INVENTION

The primary object of the present invention is to provide a structure of vehicle wheel, which improves the conventional wheels in respect of wind resistance and push-assisting force in the forward rotation direction of the wheel in order to achieve the purposes of reducing driving noise, assisting forward movement of vehicle, and reducing fuel consumption.

To achieve the above object, the present invention provides a vehicle wheel, which comprises a wheel body and a plurality of rim blades, wherein the plurality of rim blades are coupled to at least one side surface of the wheel body and each of the rim blades comprises at least one airflow guide section and at least one airflow-assisting section. The airflow guide section and the airflow-assisting section are arranged in the form of front and rear series formed on the rim blade. When the vehicle wheel is coupled with a tire, the airflow guide section is located at the side of the rim blade facing the forwarding direction of the rotation of the tire and the airflow-assisting section is located at the side of the rim blade that is opposite to the forwarding direction of the rotation of the tire so as to increase airflow, reduce wind resistance, and reduce noise and also to induce compliant airflow guidance and push-assisting forces to achieve the purpose of reducing fuel consumption of the operation of the vehicle and to ensure stability of operation of the vehicle.

The efficacy of the vehicle wheel of the present invention is that each of the rim blades is provided with a structure comprising an airflow guide section and an airflow-assisting section where the airflow guide section is located at the side of the rim blade that faces a forwarding direction of the rotation of the wheel and the airflow-assisting section is located at the side of the rim blade that is opposite to the forwarding direction of rotation of the wheel so as to increase airflow and reduce wind resistance and also generate a push-assisting force for compliantly guiding the rotation of the vehicle to assist the movement of the vehicle, reduce the fuel consumption, and stabilize the movement of the vehicle thereby improving the problem of the conventional vehicle wheel in respect of wind resistance of the wheel, reducing the noise generated by wheel during movement, reducing fuel consumption of the vehicle. Further, the vehicle wheel of the present invention is attachable to a wheel and is not constrained to specific model, brand, or brake system of the vehicle so as to further improve the economic value thereof for use in industry.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
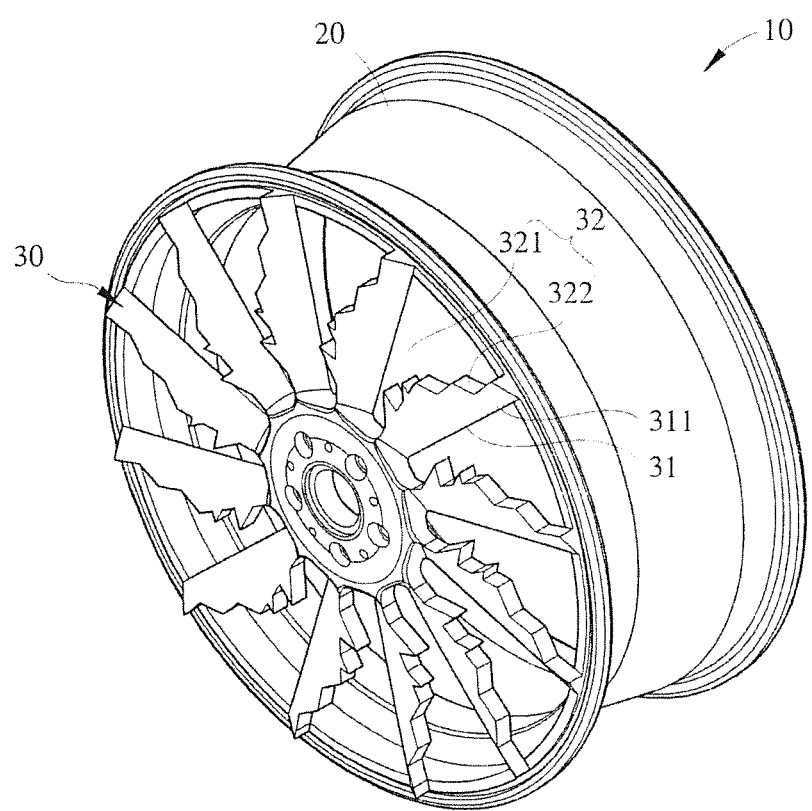
FIG. 1 is a perspective view showing a vehicle wheel constructed in accordance with a first embodiment of the present invention.
Figure 2:
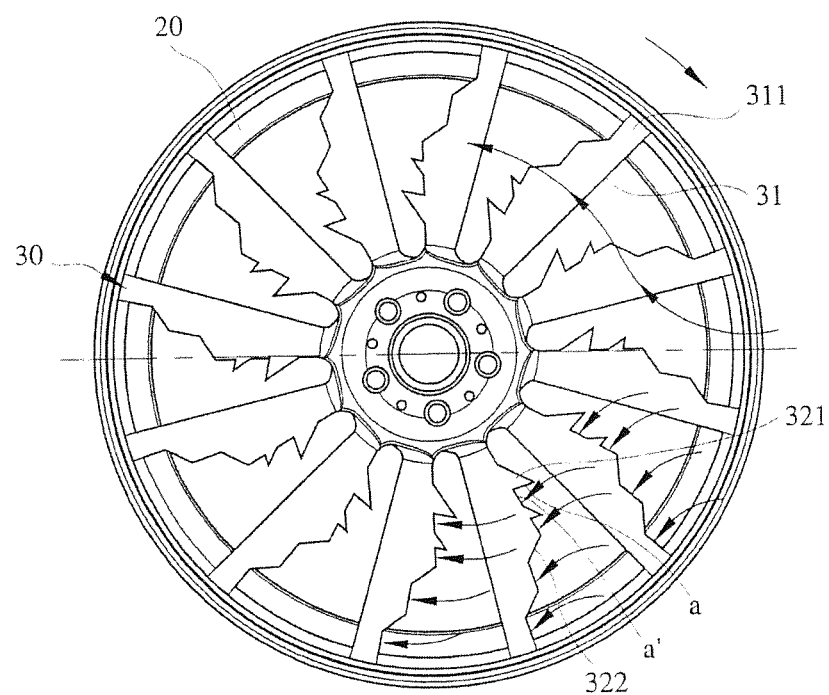
FIG. 2 is a front view of the vehicle wheel of the first embodiment of the present invention.
Figure 3:
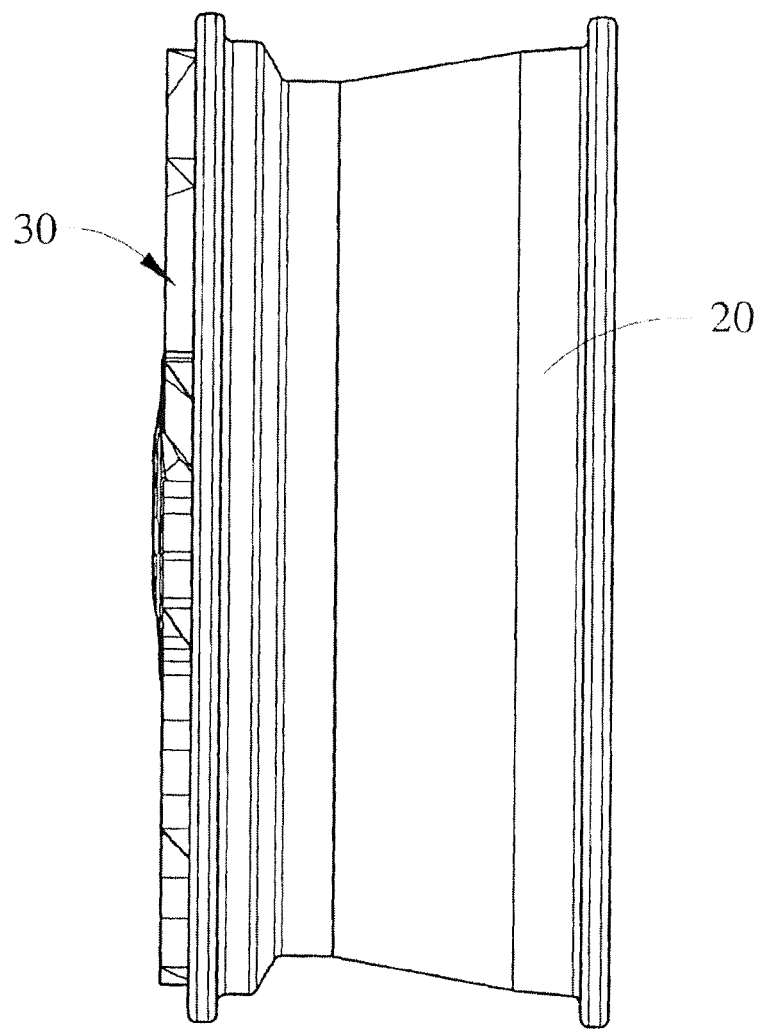
FIG. 3 is a side elevational view of the vehicle wheel of the first embodiment of the present invention.
Figure 4:
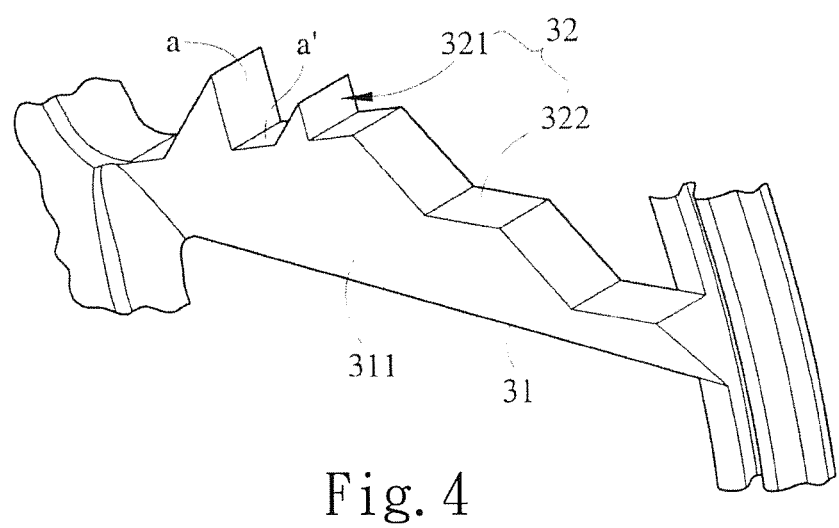
FIG. 4 is a perspective view, in an enlarged form, of a rim blade of the vehicle wheel of the first embodiment of the present invention.
Figure 5:
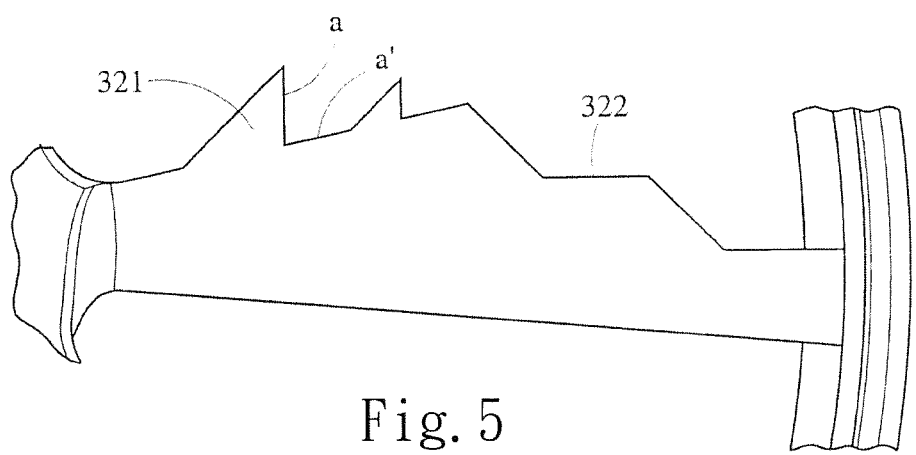
FIG. 5 is a front view, in an enlarged form, of the rim blade of the vehicle wheel of the first embodiment of the present invention.

With reference to the drawings and in particular to FIGS. 1, 2, 3, 4, 5, and 6A-6D, which show a vehicle wheel 10 constructed in accordance with a first embodiment of the present invention, the vehicle wheel 10 comprises a wheel body 20 and a plurality of rim blades 30 integrally formed with and mounted to an outside surface of the wheel body 20. The rim blades 30 are formed to integrally couple with at least one side surface of the wheel body 20 and in the present invention, coupling to the outside surface of the wheel body 20 is given as an example for explanation. Each of the rim blades 30 comprises at least one airflow guide section 31 and at least one airflow-assisting section 32, wherein the airflow guide section 31 and the airflow-assisting section 32 are formed on the rim blade 30 in the form of front and rear series.

The airflow guide section 31 comprises at least one slope guide surface 311 and the airflow-assisting section 32 comprises a plurality of guide blocks 321 and a plurality of push-assisting surfaces 322, wherein the guide blocks 321 are higher or projecting more outward than the push-assisting surfaces 322. In the first embodiment, the guide blocks 321 are in the form of a conic body and the push-assisting surfaces 322 are in the form of a stepped surface or a planar surface, whereby the guide blocks 321 and the push-assisting surfaces 322 intersect each other to define at least two push faces a, a' and the two push faces a, a' guide airflows in such a manner as to provide push-assisting forces at multiple stages. Thus, in the arrangement of the first embodiment according to the present invention, at one side of the vehicle wheel 10, an airflow guide section 31 that takes the form of a slope guide surface 311 or alternatively a concave curved surface is provided to minimize the resistance of airflow and at an opposite side of the vehicle wheel 10, an airflow-assisting section 32 is provided to serve as an airflow guide structure by which airflow push-assisting force can be generated. As such, the vehicle wheel 10 may take advantage of the airflow guide section 31, at one side, to reduce the wind resistance of airflows and also take advantage of the airflow-assisting section 32, at the opposite side, to increase the airflow push-assisting force so as to improve guidance and passage of airflows, reduce wind resistance and wind noise, and also to make the vehicle wheel 10 generating a movement-assisting force.

Figures 6A, 6B, 6C, 6D:
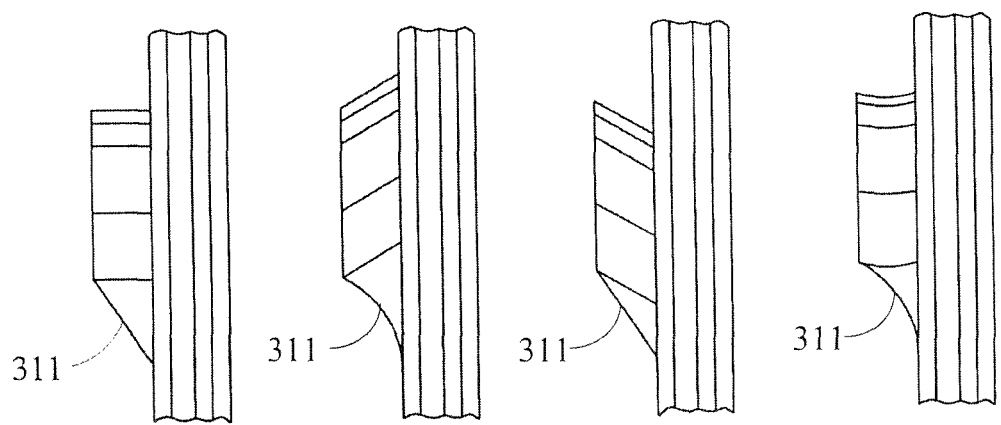
FIG. 6A is a side elevational view, in an enlarged form, of the rim blade of the vehicle wheel of the first embodiment of the present invention.
FIG. 6B is a side elevational view showing a modification of the first embodiment where a slope guide surface of an airflow guide section of the rim blade of the vehicle wheel is modified as an inclined angle.
FIG. 6C is a side elevational view showing a modification of the first embodiment where a slope guide surface of an airflow guide section of the rim blade of the vehicle wheel is modified as an inverted inclined angle.
FIG. 6D is a side elevational view showing a modification of the first embodiment where a slope guide surface of an airflow guide section of the rim blade of the vehicle wheel is modified as a lead-angle curved surface.
Figure 7:
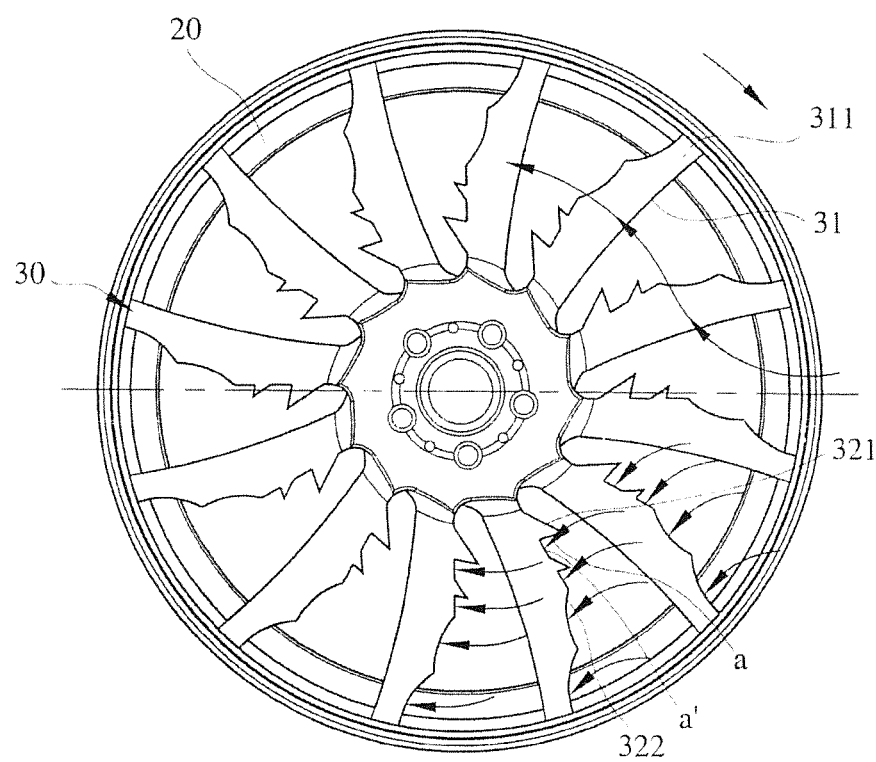
FIG. 7 is a front view showing a vehicle wheel constructed in accordance with a second embodiment of the present invention.
Figure 8:
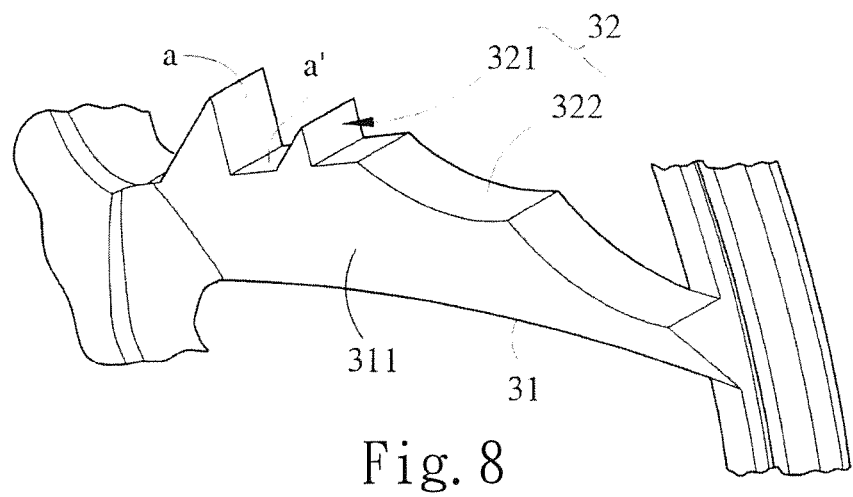
FIG. 8 is a perspective view, in an enlarged form, of a rim blade of the vehicle wheel of the second embodiment of the present invention.
Figure 9:
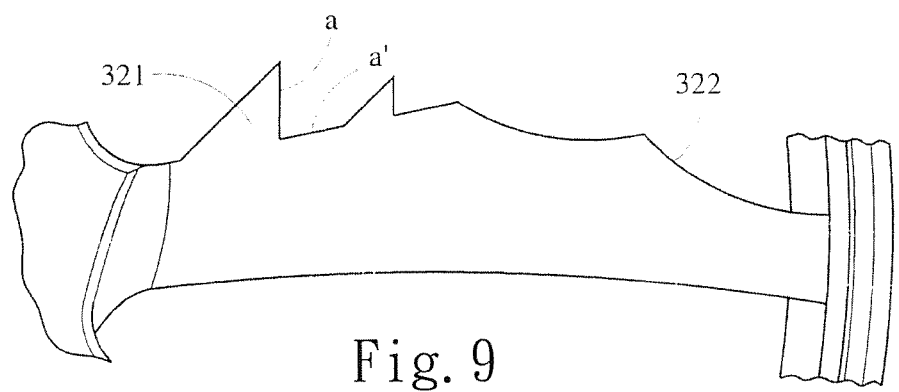
FIG. 9 is a front view, in an enlarged form, of the rim blade of the vehicle wheel of the second embodiment of the present invention.
Figure 10:
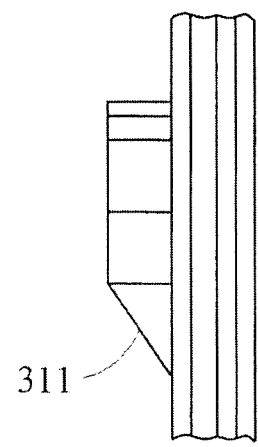
FIG. 10 is a side elevational view, in an enlarged form, of the rim blade of the vehicle wheel of the second embodiment of the present invention.
Figure 11:
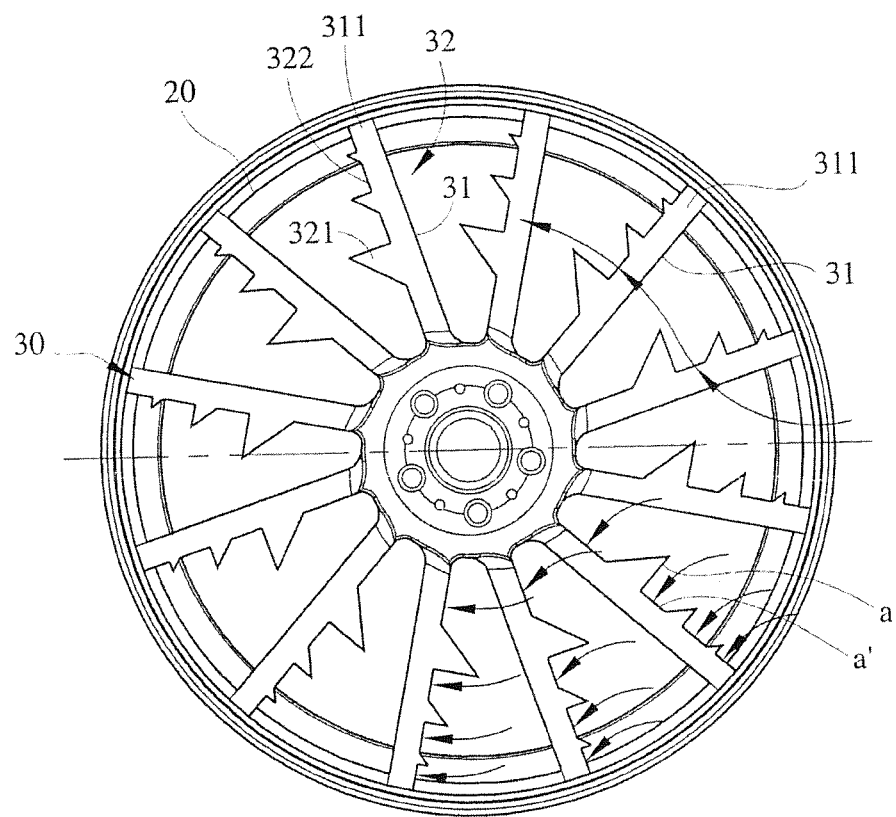
FIG. 11 is a front view showing a vehicle wheel constructed in accordance with a third embodiment of the present invention.
Figure 12:
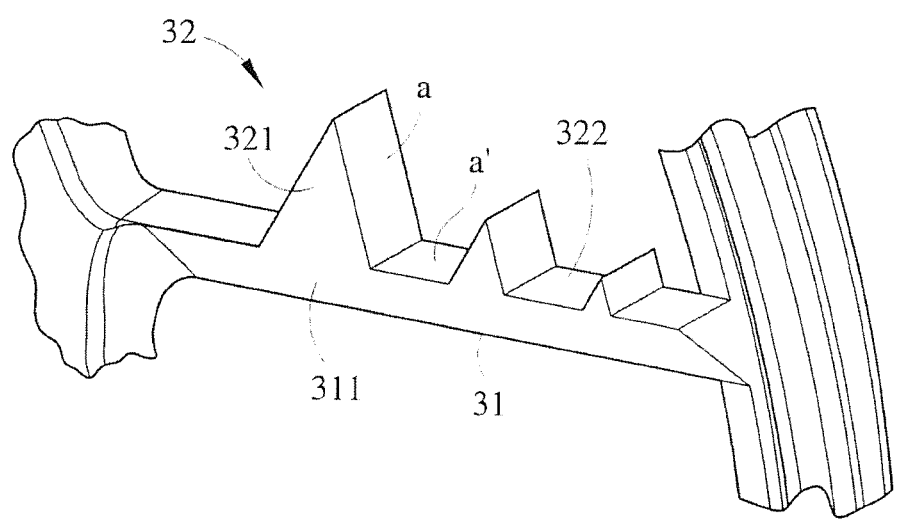
FIG. 12 is a perspective view, in an enlarged form, of a rim blade of the vehicle wheel of the third embodiment of the present invention.
Figure 13:
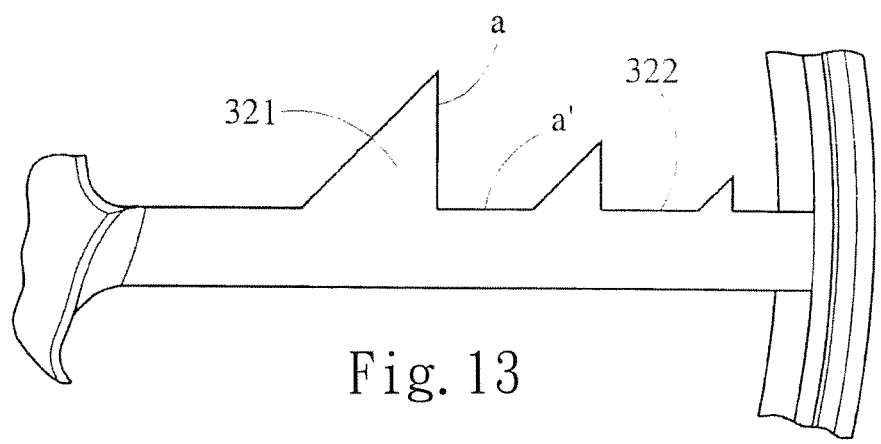
FIG. 13 is a front view, in an enlarged form, of the rim blade of the vehicle wheel of the third embodiment of the present invention.
Figure 14:
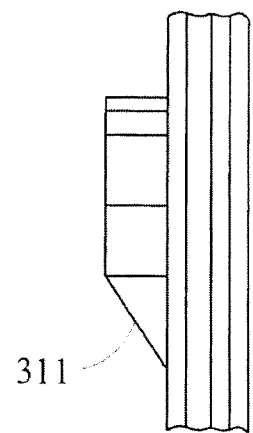
FIG. 14 is a side elevational view, in an enlarged form, of the rim blade of the vehicle wheel of the third embodiment of the present invention.

The configuration of the slope guide surface 311 of the airflow guide section 31 is not limited to any specific one and may take the form of for example a right-angled arrangement shown in FIG. 6A, an inclined angle shown in FIG. 6B, an inverted inclined angle shown in FIG. 6C, and a lead-angle curved surface shown in FIG. 6D, all being considered within the scope of the present invention.

Referring to FIGS. 7-10, which show a vehicle wheel 10 according to a second embodiment of the present invention, what is different from the first embodiment is that in the second embodiment, the guide blocks 321 are higher than the push-assisting surfaces 322 and the guide blocks 321, similar to the first embodiment, are in the form of a conic body and the push-assisting surfaces 322 are in the form of a curved surface or a planar surface. Further, the slope guide surface 311 of the airflow guide section 31 is in the form of a concave curved surface so that the slope guide surface 311 may guide airflow in a smoother manner and may significantly reduce wind resistance of airflow. The push-assisting surfaces 322 may serve as another airflow push-assisting structure by which an airflow push-assisting force can be generated. Further, the guide blocks 321 and the push-assisting surfaces 322 similarly intersect each other to form at least two push faces a, a', whereby the manner that the two guide blocks 321 and push-assisting surfaces 322 guide airflow provides push-assisting forces of the vehicle wheel 10 at multiple stages. As such, in the second embodiment of the present invention, the vehicle wheel 10 may take advantage of the airflow guide section 31 that takes a streamlined configuration of the slope guide surface 311, at one side, to minimize wind resistance of airflow and the vehicle wheel 10 may also take advantage of the airflow-assisting section 32 that comprises the guide blocks 321 and the push-assisting surfaces 322, at the opposite side, to provide another airflow guide structure by which airflow push-assisting force can be generated. When the vehicle wheel 10 according to the present invention is rotating in a forward direction (as indicated by arrow of FIG. 7), in the upper half circumference of the rotation of the wheel body 20, the slope guide surfaces 311 of the airflow guide sections 31 at one side thereof can be used to guide airflow and reduce wind resistance, while the guide blocks 321 and the push-assisting surfaces 322 of the airflow-assisting sections 32 of the vehicle wheel 10 at the opposite side, in the lower half circumference of rotation of the wheel body 20, can be used to increase the push-assisting force so as to enhance and speed up airflow guidance (as indicated by arrows in the upper and lower halves of circumference of FIG. 7) and to reduce wind resistance of airflow and noise and further achieve an effect of assisting movement of the vehicle wheel 10.

Referring to FIGS. 11-14, which show a vehicle wheel 10 according to a third embodiment of the present invention, what is different from the first and second embodiments is that in the third embodiment, guide blocks 321 of the airflow-assisting section 32 are in the form of conic bodies having different heights and the push-assisting surfaces 322 of the airflow-assisting section 32 are planar surface. Further, the slope guide surface 311 of the airflow guide section 31 is of a concave curved surface and the guide blocks 321 and the push-assisting surfaces 322 intersect each other to form at least two push faces a, a'. Similarly, the slope guide surface 311 of the airflow guide section 31 and the guide blocks 321 and the push-assisting surfaces 322 of the airflow-assisting section 32 can be used to increase and speed up guidance of airflow of the vehicle wheel 10, reduce wind resistance of airflow and noise, and further achieve an effect of assisting movement of the vehicle wheel 10.

Figure 15:
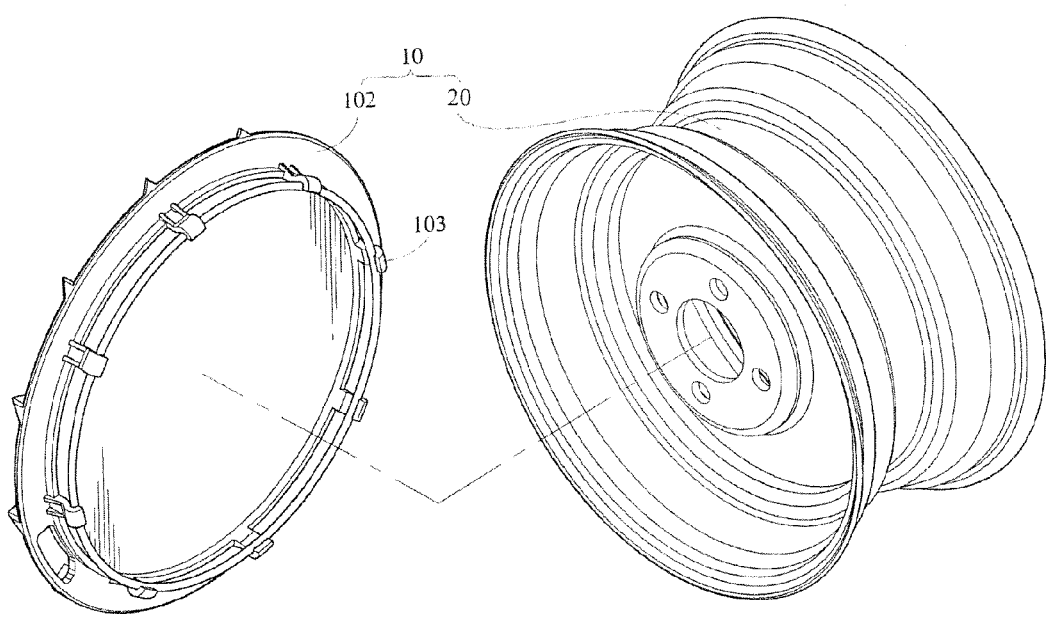
FIG. 15 is a perspective view showing a vehicle wheel constructed in accordance with a fourth embodiment of the present invention.

Referring to FIG. 15, which shows a vehicle wheel 10 according to a fourth embodiment of the present invention, beside being integrally formed together as described above, the wheel body 20 and the plurality of rim blades 30 of the vehicle wheel 10 according to the present invention can be made such that the plurality of rim blades 30 is integrally formed with a rim module 102. The rim module 102 has a circumference and a plurality of snap-fitting elements 103. The snap-fitting elements 103 can be snap-fit to a recess of an inner rim of an outside surface of the wheel body 20 to have the rim module 102 coupled to the outside surface of the wheel body 20 so that the plurality of rim blades 30 and the wheel body 20 are coupled in a two-piece removable fitting arrangement and two sides of the wheel body 20 can each receive a rim module 102 having a plurality of rim blades 30 to removably snap-fit thereto. Thus, according to different mode, brands, driving conditions, or mounting to left or right wheels of vehicle, different rim modules 102 having different arrangements of rim blades 30 can be used to couple to the outside surface of the wheel body 20 and there is no need to disassemble and replace the entire vehicle wheel 10. Further, it is convenient and easy for maintenance operators to replace and maintain the rim blades 30. Further, there is no need to prepare a large number of molds in the manufacture of the vehicle wheel 10 and it only needs to prepare two molds for separately manufacturing the wheel body 20 and the rim module 102 having various arrangements of rim blades 30. The manufacturing cost of the vehicle wheel 10 of the present invention can be greatly reduced.

The rim module 102 has a surface in which at least one air passage 102a is formed for air ventilation and heat dissipations of the interior of the wheel body 20 and also allowing for air inflation operations with an inflating valve of the wheel.

Figure 16:
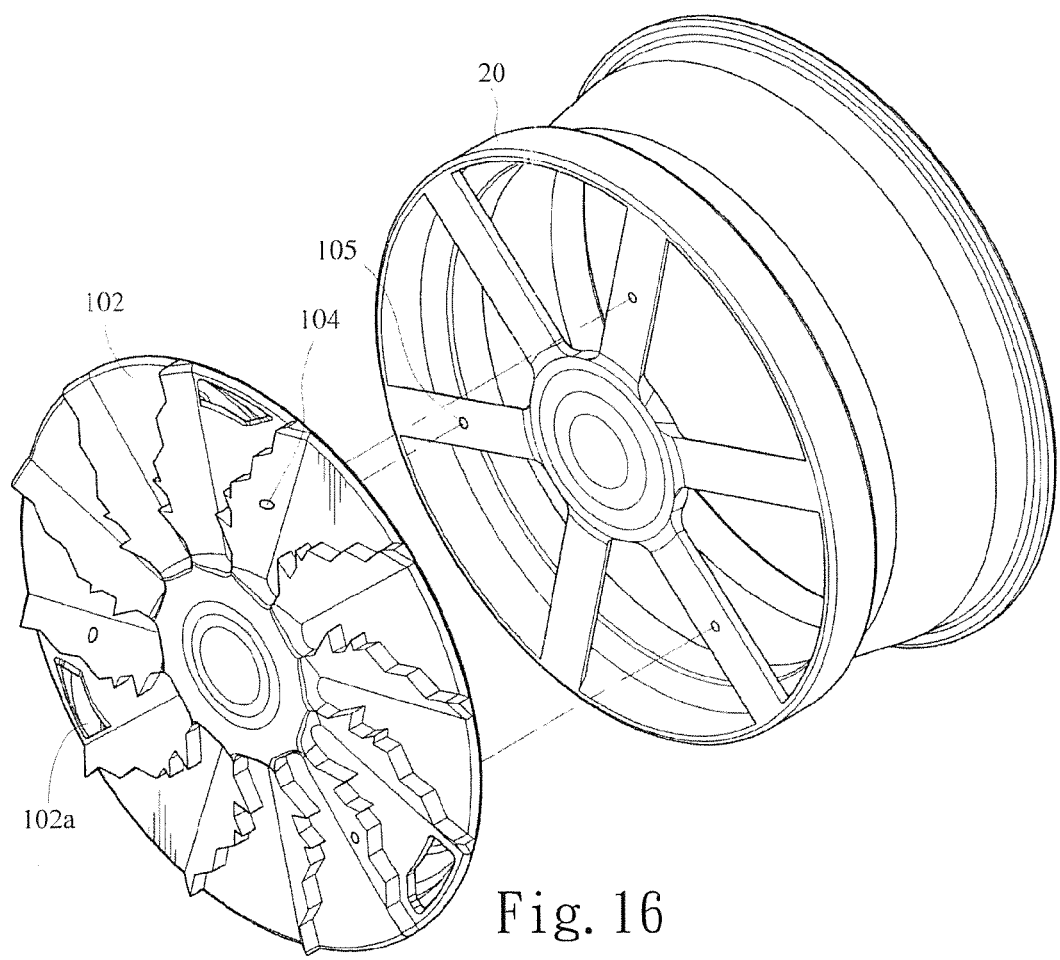
FIG. 16 is a perspective view showing a vehicle wheel constructed in accordance with a fifth embodiment of the present invention.

Referring to FIG. 16, which shows a vehicle wheel 10 according to a fifth embodiment of the present invention, the rim module 102 having a plurality of rim blades 30 integrally formed therewith shown in FIG. 15 comprises a threaded hole 104 formed in a surface of at least one of the rim blades 30. The wheel body 20 has an outside surface in which at least one locking hole 105 is formed. The threaded hole 104 and the locking hole 105 are set in alignment with each other and a fastener, such as bolt or a screw (not shown), is used to fasten them together so as to secure the rim module 102 to the outside surface of the wheel body 20. A similar arrangement of two-piece removably assembled or disassembled structure of the rim module 102 and the wheel body 20 shown in FIG. 15 can be achieved for the rim blades 30. In other words, according to different mode, brands, driving conditions, or mounting to left or right wheels of vehicle, different rim modules 102 having different arrangements of rim blades 30 can be used to couple to the outside surface of the wheel body 20 to make it convenient and easy to replace and maintain and manufacture the rim blades 30. Further, the threaded hole 104 of the rim blades 30 and the locking hole 105 of the wheel body 20 may have a threading direction that is according to the wheel body 20 being used as a left wheel or a right wheel of a vehicle. For example, when the wheel body 20 is used as a vehicle left wheel, the threaded hole 104 and the locking hole 105 may have threading that is clockwise threading; oppositely, when the wheel body 20 is used as a vehicle right wheel, the threaded hole 104 and the locking hole 105 may have threading that is counterclockwise threading, whereby the rim blades 30 can be more securely fixed through the assembling of the rim module 102 and the wheel body 20 without being affected by the rotation direction and centrifugal force of the vehicle wheel 10.

Figure 17:
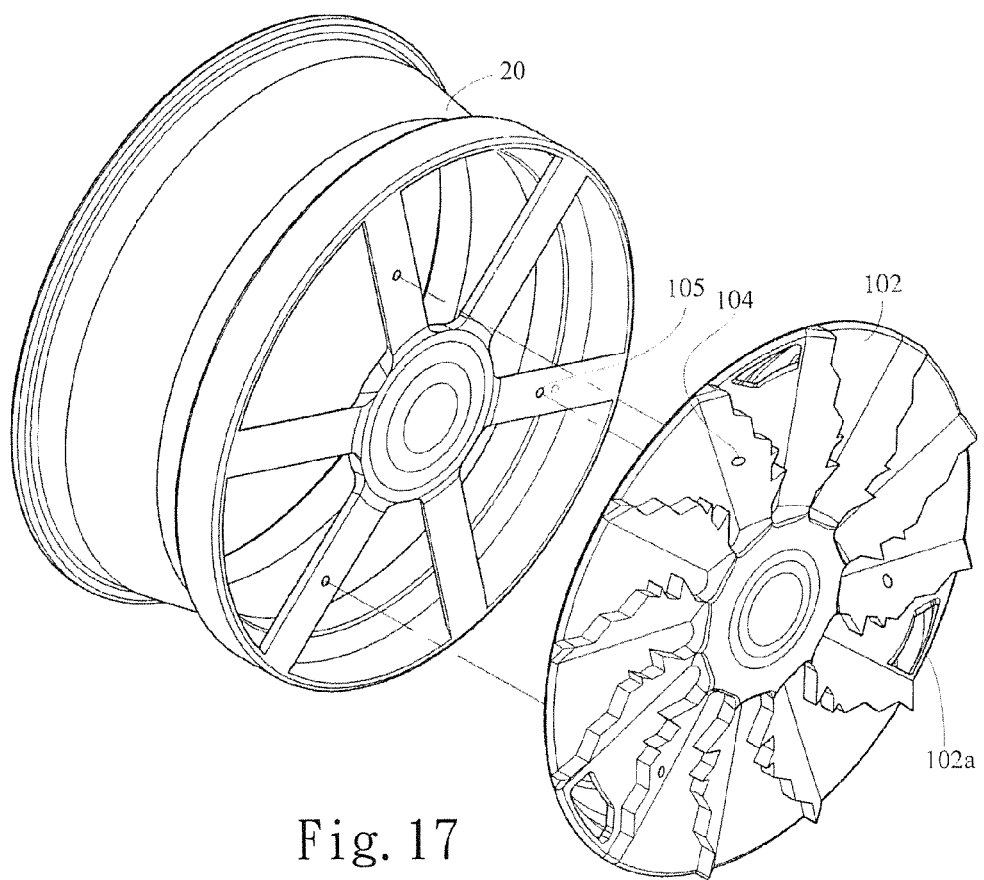
FIG. 17 is a perspective view showing a vehicle wheel constructed in accordance with a sixth embodiment of the present invention.

Referring to FIG. 17, which shows a vehicle wheel 10 according to a sixth embodiment of the present invention, what is different from the fifth embodiment of FIG. 16 is that the threaded hole 104 of the rim blades 30 of the rim module 102 and the locking hole 105 of the outside surface of the wheel body 20 are of a size-asymmetry arrangement, wherein at least one set of threaded hole 104 and locking hole 105 has a diameter that is smaller than (as shown in FIG. 17) or greater than the diameters of other threaded holes 104 and locking holes 105. In other words, besides the threaded holes 104 and the locking holes 105 being necessarily mating each other in respect of the position, they also need to mate each other in respect of the diameter, in order to have the rim blades 30 of the rim module 102 coupled to the outside surface of the wheel body 20. Besides the above discussed two-piece removably assembling/disassembling arrangement achieved with the rim blades 30 and the wheel body 20, an effect of being fool-proof or mistake-proof for the coupling between the rim blades 30 of the rim module 102 and the wheel body 20 can be achieved.

Figure 18:
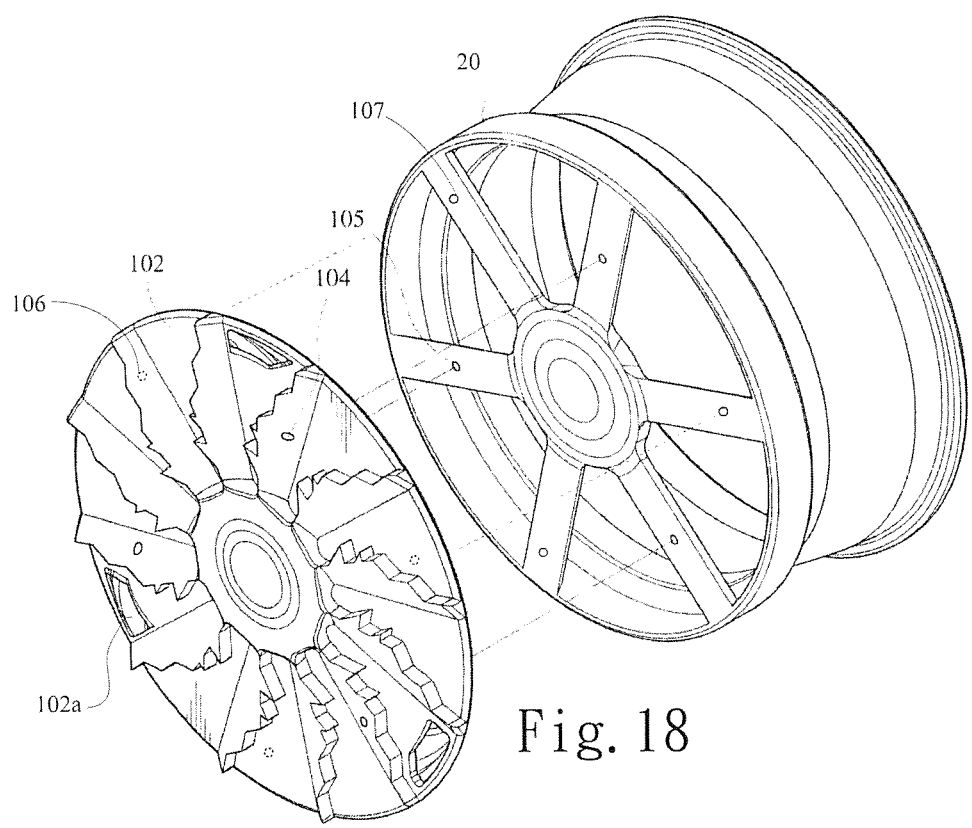
FIG. 18 is a perspective view showing a vehicle wheel constructed in accordance with a seventh embodiment of the present invention.

Referring to FIG. 18, which shows a vehicle wheel 10 according to a seventh embodiment of the present invention, what is different from the fifth and sixth embodiments of FIGS. 16 and 17 is that at least one first mating element 106 is provided on a back side of the rim module 102 having a plurality of rim blades 30 integrally formed therewith and at least one second mating element 107 is provided on the outside surface of the wheel body 20. The first mating element 106 is not limited to any specific form and can be a projection or a recess. The second mating element 107 is not limited to any specific form and can be a recess or a projection. In the embodiment illustrated in FIG. 18, the first mating element 106 is a projection and the second mating element 107 is a recess, whereby when the rim module 102 having a plurality of rim blades 30 integrally formed therewith and the wheel body 20 are coupled to each other, besides mating of the threaded hole 104 and the locking hole 105, the first mating element 106 and the second mating element 107 must be set to mate each other so that the rim blades 30, when mounted through the coupling of the rim module 102 and the wheel body 20, has a fool-proof and mistake-proof effect and may provide a more balanced and secured arrangement with the mating between the first mating element 106 and the second mating element 107.

Figure 19:
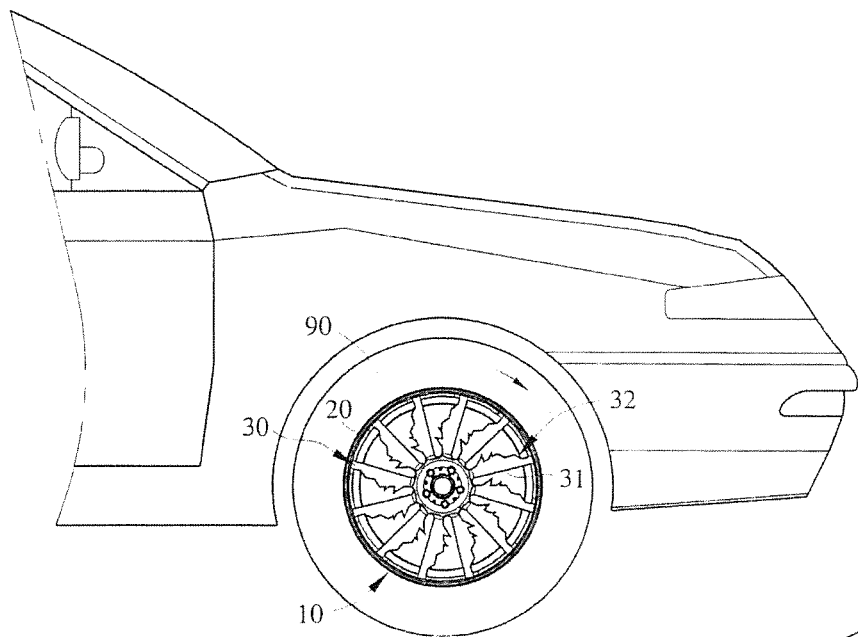
FIG. 19 is a schematic view showing a vehicle wheel according to the present invention applied to a right wheel of a vehicle.
Figure 20:
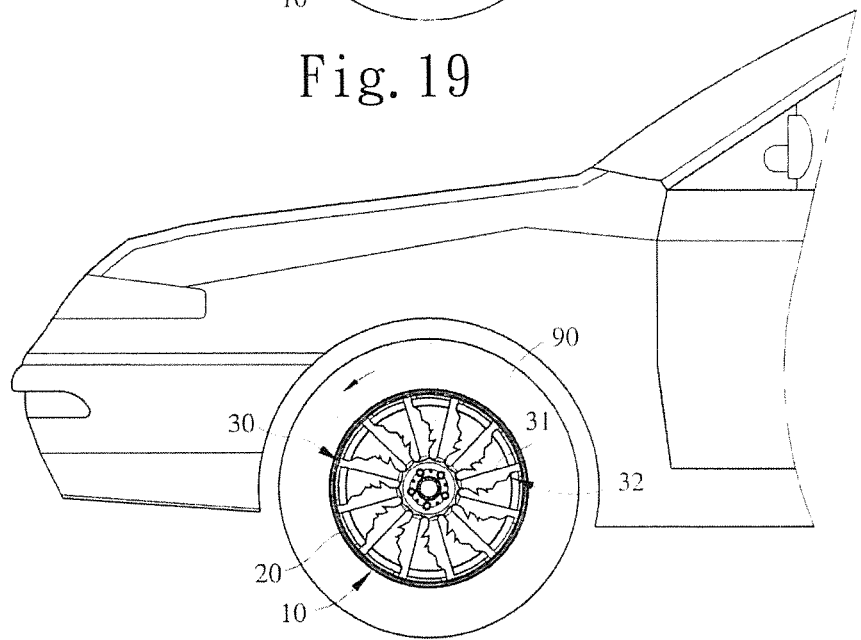
FIG. 20 is a schematic view showing a vehicle wheel according to the present invention applied to a left wheel of a vehicle.

Referring to FIGS. 19 and 20, examples of application of the vehicle wheel 10 of the present invention to a right wheel and a left wheel of a vehicle 100 are illustrated. As shown in FIG. 18, the example of the vehicle wheel 10 of the present invention applied to the right wheel of the vehicle 100 is given and FIG. 19 is the example that the vehicle wheel 10 is applied to the left wheel of the vehicle 100. Besides a circumference of the wheel body 20 being used to couple a tire 90, the rim blades 30 can be integrally formed with either side of the wheel body 20 in the same way as that described with reference to the first to third embodiment to form either a right-wheel type or a left-wheel type vehicle wheel 10 with the rim blades 30 integrally formed therewith, or alternatively, by taking the same manner as that described with reference to the fourth to seventh embodiment, a rim module 102 having a plurality of rim blades 30 integrally formed therewith and a wheel body 20 are made in a two-piece removably assembled arrangement to allow a rim module 102 that comprises a plurality of rim blades 30 integrally formed therewith to be mounted to an outside surface of the wheel body 20 for being applicable to a right wheel or a left wheel of a vehicle, whereby when the vehicle wheel 10 drives a tire 90 for forward rotation (as indicated by arrows of FIGS. 19 and 20), in the rotation of the tire 90 in the upper and lower halves of the circumference, the slope guide surface 311 of the airflow guide section 31 and the guide blocks 321 and the push-assisting surfaces 322 of the airflow-assisting section 32 of the rim blades 30 respectively increase and speed up airflow guidance of the vehicle wheel 10 and reduce wind resistance of airflow and noise to further achieve an effect of assisting movement of the vehicle 100 with the vehicle wheel 10 and the tire 90.

Figure 21:
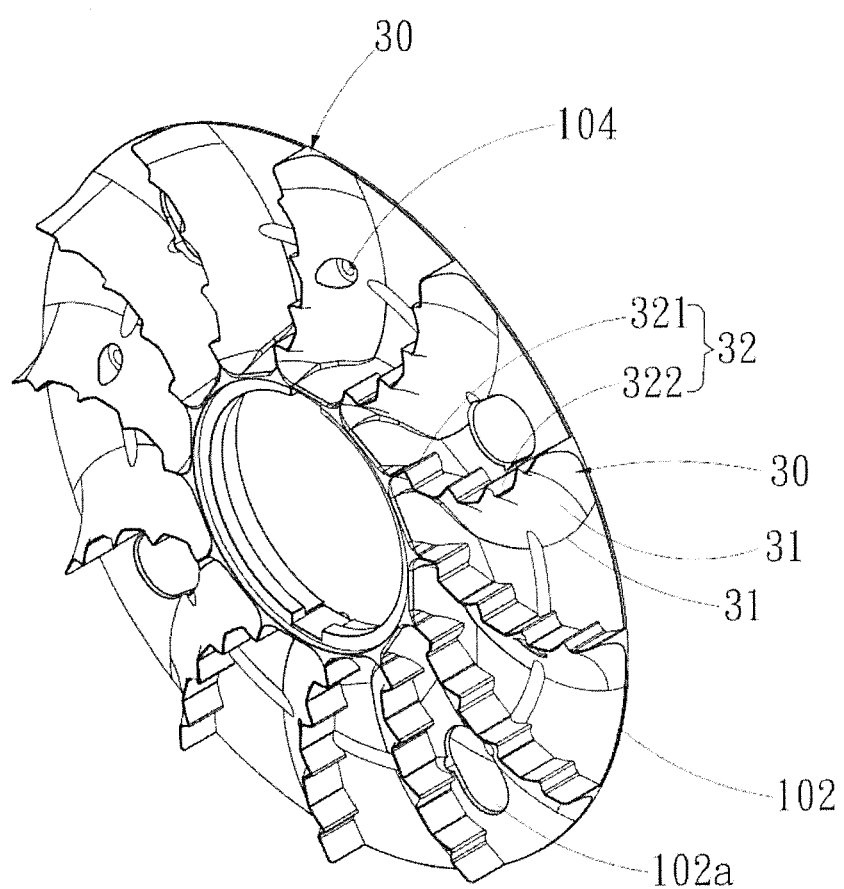
FIG. 21 is a perspective view showing a vehicle wheel constructed in accordance with an eighth embodiment of the present invention.

Referring to FIG. 21, which shows a vehicle wheel 10 according to an eighth embodiment of the present invention, a rim module 102 is provided, having a plurality of rim blades 30 integrally formed therewith and each of the rim blades 30 is shaped in the form of a wing. Each of the rim blades 30 comprises at least one airflow guide section 31 and at least one airflow-assisting section 32, wherein the airflow guide section 31 and the airflow-assisting section 32 are arranged in the form of front and rear series formed on the rim blades 30. The airflow guide section 31 comprises at least one slope guide surface 311 and the airflow-assisting section 32 comprises a plurality of guide blocks 321 and a plurality of push-assisting surfaces 322. The guide blocks 321 have a height that is greater than that of the push-assisting surfaces 322. The guide blocks 321 and the push-assisting surfaces 322 provide, similarly, push-assisting forces at multiple stages. At least one of the rim blades 30 of the rim module 102 has a surface in which at least one threaded hole 104 is formed for mating the locking hole 105 formed in the outside surface of the wheel body 20 shown in FIG. 17. The rim module 102 has a surface in which at least one air passage 102a is formed for ventilation and heat dissipation of the interior of the wheel body 20 and also allowing for air inflation operations with an inflating valve of the wheel.

In summary, the present invention provides a vehicle wheel 10 that is a wheel for low wind resistance driving, reducing driving noise, and reducing energy and fuel consumption for various type of vehicle and can effectively overcome the problem of the conventional wheels that only address decoration issue but is not capable of reducing wind resistance, noise, and fuel consumption. Further, the present invention provides a vehicle wheel 10 that comprises rim blades 30 and a wheel body 20 that are removably assembled in a two-piece removably assembling/disassembling arrangement, which is applicable to vehicles of various models and brands, such as bicycles, motorcycles, and automobiles of various brands and models. For both left and right wheels of both new and used vehicles, the vehicle wheel 10 of the present invention can be applied without affecting braking or wheel structure or operation of the vehicles.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vehicle wheel, comprising:
a wheel body rotatable about an axis; and
a plurality of rim blades coupled to at least one side surface of the wheel body, each of the rim blades flaring outward from the side surface to define an asymmetric sectional contour and including an airflow guide section and an airflow-assisting section, wherein the airflow guide section and the airflow-assisting section are arranged at front and rear portions of the rim blades, and the airflow-assisting section includes a series of disparately angled surface sections.

2. The vehicle wheel as claimed in claim 1, wherein the rim blades are integrally formed on the side surface of the wheel body.

3. The vehicle wheel as claimed in claim 1, wherein the airflow guide section includes at least one slope guide surface.

4. The vehicle wheel as claimed in claim 1, wherein the surface sections of the airflow-assisting section include a plurality of guide blocks and a plurality of push-assisting surfaces, the guide blocks having a height greater than a height of the push-assisting surfaces.

5. The vehicle wheel as claimed in claim 4, wherein the guide blocks and the push-assisting surfaces intersect each other to form at least two push faces.

6. The vehicle wheel as claimed in claim 4, wherein the push-assisting surfaces are each constituted by one of a stepped surface, a curved surface, a lead-angle curved surface, and a planar surface.

7. The vehicle wheel as claimed in claim 1, wherein the rim blades are integrally formed with a rim module, the rim module having a circumference on which a plurality of snap-fitting elements is provided, the snap-fitting elements being snap-fit to a recess of an inner rim of an outside surface of the wheel body to have the rim module coupled to the outside surface of the wheel body.

8. The vehicle wheel as claimed in claim 1, wherein the rim blades are integrally formed with a rim module, at least one of the rim blades having a surface in which at least one threaded hole is formed, the wheel body having an outside surface in which at least one locking hole is formed, whereby the threaded hole and the locking hole, when being set to correspond to each other, receives a fastener applied thereto for fastening together.

9. The vehicle wheel as claimed in claim 8, wherein the rim module has a rear surface on which at least one first mating element is formed and the outside surface of the wheel body comprises at least one second mating element formed thereon whereby the first mating element and the second mating element are engageable with each other.

10. The vehicle wheel as claimed in claim 9, wherein the first mating element comprises a projection and the second mating element comprises a recess.

* * * * *